July 9, 1968     A. COLONNA     3,391,632
COFFEE MAKER AND BREWER
Filed May 2, 1967     2 Sheets-Sheet 1
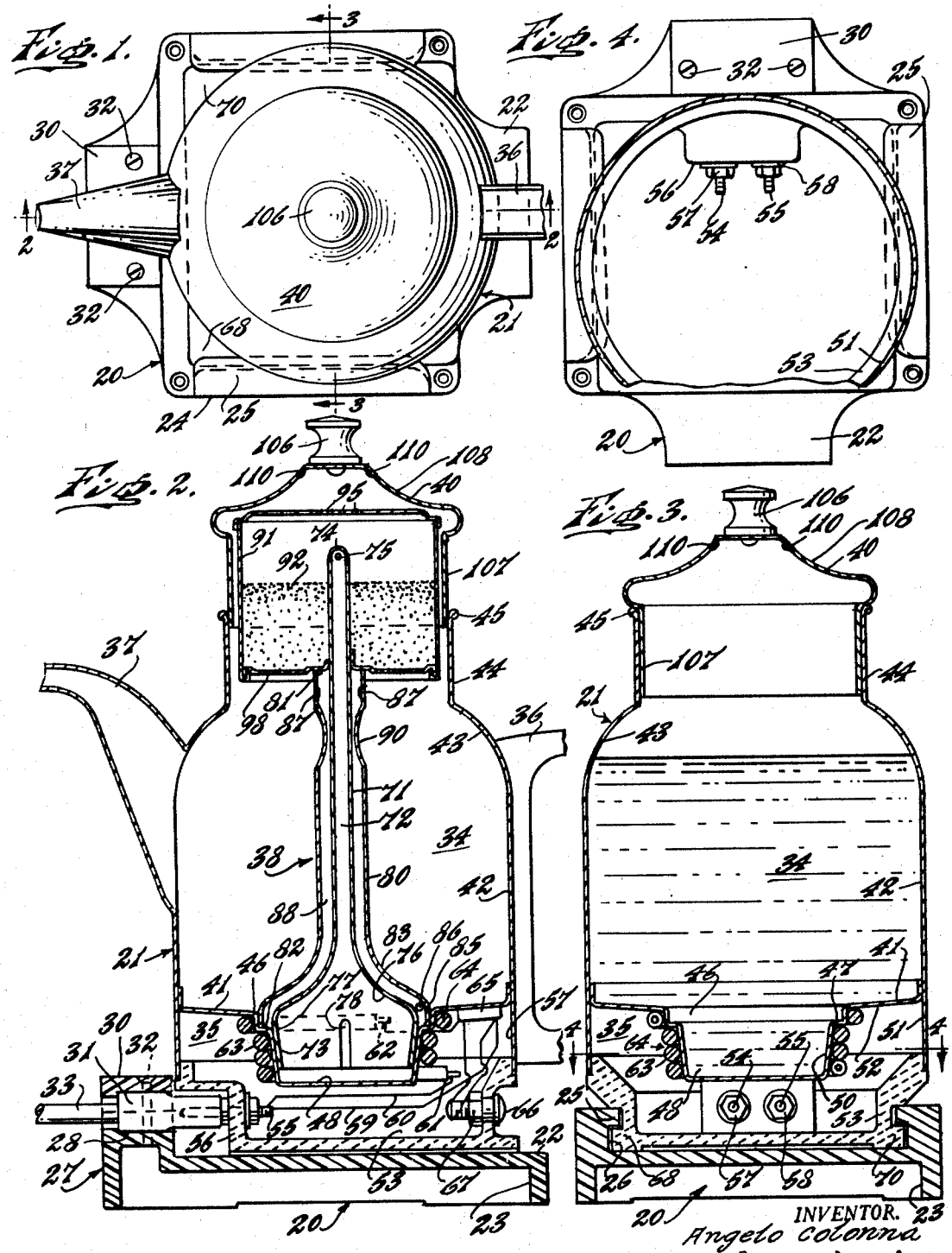
INVENTOR.
Angelo Colonna
BY Jackson Jackson
and Chovanes
ATTORNEYS July 9, 1968     A. COLONNA     3,391,632
COFFEE MAKER AND BREWER
Filed May 2, 1967     2 Sheets-Sheet 2
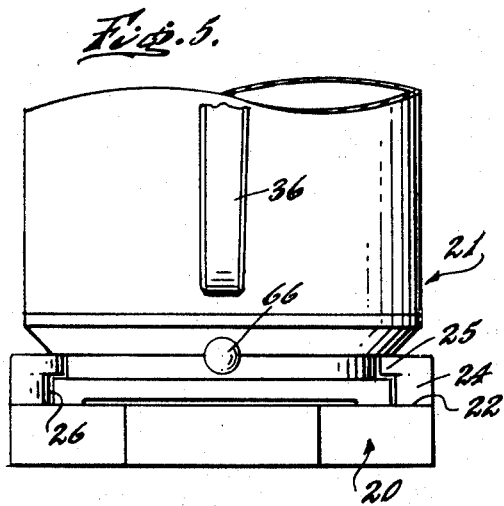
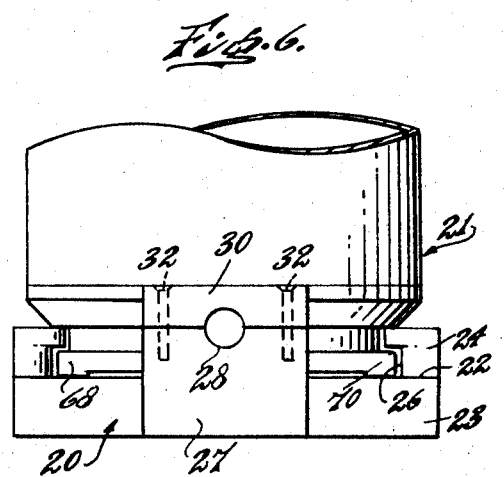
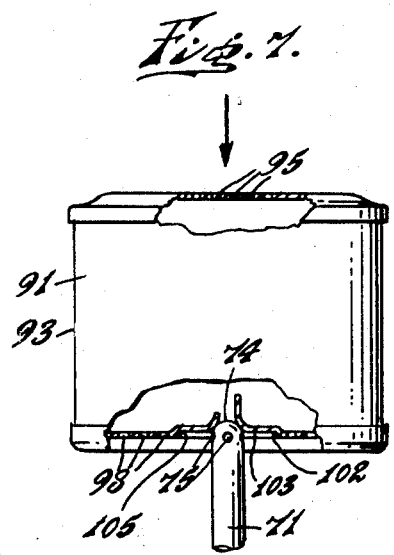
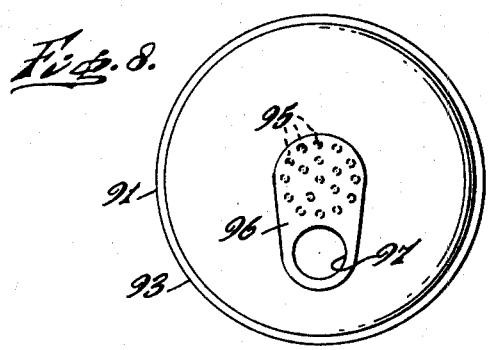
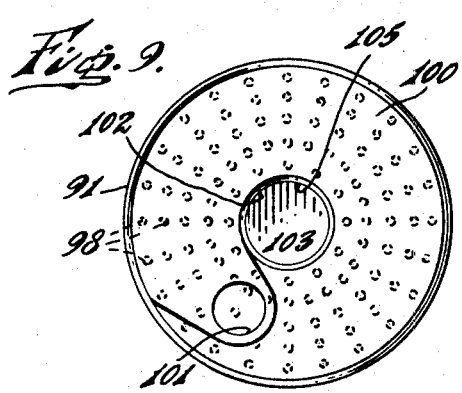
INVENTOR.
Angelo Colonna
BY
ATTORNEYS United States Patent Office
3,391,632
Patented July 9, 1968

3,391,632
COFFEE MAKER AND BREWER
Angelo Colonna, 2114 Bowler St.,
Philadelphia, Pa. 19115
Filed May 2, 1967, Ser. No. 635,560
5 Claims. (Cl. 99—279)

ABSTRACT OF THE DISCLOSURE

This is a combination coffee brewer and server which brews coffee by infusion means and which is subsequently converted to a coffee server. The device uses an infusion cartridge in the form of a can which is disposable and which contains the coffee grains. The device includes a base wherein a brewer and server assembly can be selectively and readily connected and disconnected electrically and structurally.

BACKGROUND OF THE INVENTION

*Field of the invention.*—The device pertains to a combination coffee brewer and server and more particularly with a brewer of relatively small quantities of coffee, for instance, of a capacity from 2 to 15 cups. The coffee maker is an infusion or percolator type wherein the water is heated in a container at a lower level and then travels upwardly through a tube to spray above the coffee grounds supply after which the coffee drips back into the container. The device of the invention is particularly adapted for use in vehicles, on land, sea and air, but additionally the device can be used in stationary commercial establishments such as hotels, restaurants, and other institutions, as well as homes.

*Description of the prior art.*—Numerous prior art percolators to brew coffee are now in use. There are however, many disadvantages to these existing percolators.

First, the percolator must be filled with coffee grounds in loose form wherein the grounds are poured by the user from a bulk supply into the percolator strainer cup. This is a messy and time consuming operation. Additionally, the bulk coffee supply, being exposed to the air under improper storage conditions, may be stale, particularly since a relatively large quantity must be opened initially to provide a continuing supply for numerous subsequent brews.

Furthermore, the user, in filling the strainer cup from a bulk supply, may misjudge the quantity necessary for a proper brew, and the end result may be a coffee which is too weak or too strong.

Handling of the loose coffee grounds must again take place after the brew is made in the percolator, and the grounds are spent. The percolator strainer cup must be removed from the percolator, and the grounds must be disposed of by dumping, shaking, or scraping, and with subsequent washing of the cup. This operation again is messy, time-consuming, inefficient, and unsanitary, particularly where the cup is not thoroughly washed. In many instances, the user, instead of removing the strainer cup immediately at the end of brewing, allows the grounds to remain in the percolator until after the brewed coffee is consumed. This prolonged exposure effects excess extraction from the ground, and this results in bitter coffee.

Additionally, in prior art percolators, the water which is boiled locally at a lower level whereby it expands and forces boiling water up through the tube, is chilled by the surrounding water as it travels upwardly. Hence, the water, when it is sprayed and brought into contact with the coffee grounds, is substantially below the boiling point of water and does not efficiently and thoroughly extract from the grounds the coffee flavor. Thus the water must be continually recirculated through the grounds until the entire contents of the pot is raised to a high level of heat so as to minimize chilling of the liquid being passed through the coffee grounds. This method employs a relatively long length of time and as a result destroys the fine coffee flavor.

In addition, in prior art coffee brewers of the electrical type, the electrical connecting rod is connected to the brewer and relative difficulty is encountered in engaging and disengaging the plug from the receptacle.

It is a purpose of the present invention to eliminate the disadvantage set forth above. The coffee grounds are readily discarded after use by merely removing the can and discarding it.

It is a further purpose of the present invention to achieve complete heating of the water on its upward travel into the infusion device and preserve it at this elevated condition, maintain it, so as to achieve the best and highest elevation.

A further purpose is to eliminate the need for handling coffee grounds in a percolator from a bulk supply.

A further purpose is to provide a base which can be readily anchored to a counter or the like, wherein the base can selectively receive and hold the brewer and server assembly.

A further purpose of the invention is to secure an electrical receptacle in the base whereby a brewer and container assembly can be easily, quickly, and safely electrically connected and disconnected by removing the coffee brewer and container from the base.

A further purpose is to utilize a common form of electrical extension cord in a coffee brewing and serving device wherein the brewer and server can be readily electrically connected and disconnected.

SUMMARY OF THE PRESENT INVENTION

The present invention involves a coffee brewer and container which is used initially to brew the coffee and then subsequently to contain, heat, and pour the coffee. Coffee grounds used for brewing the coffee are contained in a readily disposable infusion can having readily exposed openings. The openings at the top and bottom of the can are preliminarily covered by a flexible foil, preferably metallic, which is pierced or removed immediately prior to the brewing of the coffee. A fast boiling of the water is provided for proper extraction of the coffee grounds.

A shield, concentrically disposed with respect to the percolating tube, extends around the percolating tube and acts as a barrier between the water in the container and the percolating tube.

The brewer and server assembly has mounted therein in a lower compartment the electrical resistance coils for creating heat. The brewer and server suitably engage into, and are held secured thereto, a base which has electrical connections and terminals. The base has tracks which receive guides on the brewing and serving assembly. The base holds the brewer and server assembly very securely thereto, even under a rocking or other movement on, for instance, a vehicle, which may be a ship, train, or plane.

DESCRIPTION OF THE DRAWINGS

FIGURE 1 is a top plan view of the coffee maker of the invention.

FIGURE 2 is a sectional elevation taken on the line 2—2 in FIGURE 1.

FIGURE 3 is a vertical section taken on the line 3—3 of FIGURE 1, with the infusion can, percolator tube, and shield removed, and a quantity of coffee being held in the container, ready to be served.

FIGURE 4 is a horizontal section taken on the line 4—4 of FIGURE 3.

FIGURE 5 is a fragmentary front view showing the container secured in the base.

FIGURE 6 is a fragmentary rear view showing the container secured in the base.

FIGURE 7 is an elevational view of the can of the invention partially broken away, showing the percolator tube partially inserted.

FIGURE 8 is a top view of the infusion can.

FIGURE 9 is a bottom view of the infusion can.

DESCRIPTION OF THE PREFERRED EMBODIMENTS

The device of the invention comprises a base 20, and a brewing and serving assembly 21 intended to be held and secured in the base 20. The base is suitably rectangular in plan view and has a top 22, depending skirts 23, flanges 24 extending upwardly from the top 22, and angle portions 25 extending toward one another to form a track 26 for receiving guides on the bottom of brewer and server assembly 21. The base 20 has a plug securing portion 27 which has a depressed section at 28 and a top clamp 30. A plug receptacle 31 of a common type is held in portion 27 by screws 32 which pass through the clamp 30. An electrical cord 33 extends from the receptacle plug 31, and has at its end a common type of male plug which is intended to be plugged into a wall outlet.

The brewer and server assembly 21 has a container portion 34, an electrical heating compartment 35, a handle 36, a spout 37, a percolator assembly 38, and a lid 40.

The container portion 34 has a bottom 41, side wall 42, curved shoulder 43, and an upwardly extending portion 44. A suitable bead 45 extends around the top of the extension 44.

The bottom 41 has a well 6 which includes step 47 and cup 48, having an inclined sidewall 50.

The electrical heating compartment 35 is integral with container 34 and includes sidewall 51 which is the underside of bottom 41 of the container 34, and an electrically insulated bottom support 53. The bottom support 53, which can be suitably of a molded, electrically insulating plastic, has secured thereto prongs 54 and 55 which form terminals for insertion into a plug as later described. The prongs 54 and 55 are anchored in a recessed portion 56 of the bottom support 53 by means of locking nuts 57 and washers 58.

Electrical leads 59 and 60 connect connect respectively to terminals 61 and 62 and the ends of a coil resistor 63. Coil resistor 63 is spirally wound at 64, around the well 46. A thermostat 65 is connected in series in lead 59 to interrupt or close the electrical circuit to the resistor 63 to control the boiling cycle and to maintain the brewed coffee within a suitable temperature range, in a manner well known in the art.

A pilot light 66 is held in base 53 by means of nut 67 to indicate when the circuit to resistor 63 is closed, and heat is being supplied to the assembly.

Bottom support 53 has along its sides, a viewed particularly in FIGUES 2 and 3, runners or guides 68 and 70 which are of the same contour as tracks 26 on base 20, and which slidably engage therein.

When runners 68 and 70 are engaged in tracks 26, the brewer and server assembly 21 is securely and accurately aligned within the base 20. Also, as the assembly 21 is pushed into the base 20 on runners 68 and 70, prongs 54 and 55 are inserted into plug 31 and an electrical connection is made thereto.

A percolator tube 71 has a bore portion 72 and a skirt portion 73. The bore portion has a closed top 74 and holes 75. The skirt 73 is connected to bore 72 by shoulders 76. The skirt has a tapered side wall 77 which is of a suitable size and contour to slidably and forcibly engage into well 46. Skirt 73 has a depressed channel 78, vertical in direction, which extends above the well 46 when the percolator tube 71 is engaged in the well.

A shield 80 surrounds the percolator tube 71 and slidably and forcibly engages into step 47 in well 46. The shield 80 is open at the top 81 and bottom 82, and has a flaring portion 83 which is similar to the contour of shoulder 77 of percolator tube 71, but slightly larger in size. A downwardly extending skirt 85 slidably engages step 46 in bottom 41 of the container 34. A hole 86 extends through the shield at its lower end, and holes 87 extend through the upper end, to permit a restricted quantity of water to enter into the space 88 between the shield 80 and the percolator tube 71. Shield 80 has a reduced annular section 90 which guides and supports bore 72 of percolator shaft 71.

The shield supports at its top thereof an infusion can 91 containing coffee grounds 92, as best seen in FIGURE 2.

The infusion can 91 itself is best seen in FIGURES 2 and 7 through 9 inclusive. The can 91 is a right circular cylinder and has a solid curved sidewall 93. The top has perforations 95 in a circular pattern covered by a flexible foil 96, suitably of metal, which is initially adhesively or otherwise secured over holes 95, but which is intended to be peeled off prior to use in the brewer and server assembly of the invention. The foil 96 has a ring 97 which is intended to be grasped with a finger to remove foil 96 from the can and expose openings 95.

The bottom of can 91 has a plurality of openings 98 spaced over the entire bottom. A flexible foil 100 is initially suitably secured, as by adhesive, to cover the openings, with the foil being removed prior to use in the percolator by pulling on ring 101 to peel, or unwrap the foil from the can, thus exposing openings 98.

The bottom of the can 91 also has a pre-scored portion 102, circular in shape except for a solid segment at 103 in the circumference. The portion 102 is intended to tear under the force of the end 74 of percolator shaft 71, as shown in FIGURE 7 were the can is being forced over the top of the shaft into a position as finally shown in FIGURE 2. It should be noted that the top of the shield 80 at 81 supports the infusion can 91 in position at the upper end of container 34, and suitably within extension 44. The can 91 may optionally have a recessed portion 105 concentrically surrounding prescored portion 102, to receive and center on the top of the shield.

Preferably, the level of the coffee grounds within the can 91 is about half-way, thus allowing room for expansion of the grounds within the can when the boiling liquid rises within the tube 71 and sprays over the grounds.

The lid 40 includes a knob 106 and a depending skirt 107 suitably of a size to fit within the extension 44 of container 34 as seen in FIGURES 2 and 3. The skirt 107 is of a sufficient height to extend around the can 91 and into the extension 44 when the can is in place in the container 34 while the coffee is being brewed, or in the alternative, the skirt 107 can fit wholly within the container extension when the can is removed and the coffee is ready to be served as in FIGURE 3.

The lid 40 has an upwardly tapering portion at 108 and holes therein at 110.

In operation, the base 20 is optionally secured to a counter or the like by bolting or otherwise. The plug receptacle 31 is secured to the base by tightening screws 32 to bring clamp 30 into secure engagement with the receptacle plug 31 and hold it firmly on the base.

The plug on cord 33 at the end remote from receptacle 31 is inserted into a wall outlet. At this time, the brewer and server assembly 21 is off the base. The lid 40 is removed and the percolator tube 71 is inserted into container 34 by forcing skirt portion 73 into cup 48 of well 46. Next, shield 80 is inserted over percolator tube 71 and forced into engagement with step 47 in bottom 41 of the container 34.

A proper amount of cold water is then poured into the container. This amount can vary depending on the quantity of coffee desired to be brewed, and the amount of coffee grounds to be used.

An infusion can 91 is prepared for insertion into the brewer and server assembly 21 by peeling from the can foil strips 96 and 100 and the top and bottom thereof by engaging a finger in rings 97 and 101 respectively and pulling. After openings 95 and 98 are exposed, the can is forced downwardly, as shown by the arrow in FIGURE 7, over the top of the percolator tube at 74 until the can rests on the top of the shield 80 at 81, in a position as shown in FIGURE 2. The lid 40 is then put into position at the top of the container 34.

The brewer and server assembly 21 is then grasped, by the user, by handle 36, and the assembly is slid into engagement with base 20. Runners 68 and 70 engage tracks 26, and the assembly 21 is pushed into the base as far as possible.

The prongs 54 and 55 are aligned with the plug receptacle 31 and engage therein.

Electrical current is supplied through the circuits to resistor coil 63, and the cup 48 in well 46 is heated to cause water within the cup in the container portion to boil. The boiling water rises within the percolator tube and sprays out at the upper end of the tube through holes 75 over the grounds within the can. The boiling water passes over the grounds, extracting the coffee flavor, and drips down through openings 98 into the container 34. The openings 95 at the top of the can permit air to pass into the can, preventing a vacuum lock within the can. Openings 110 in lid 40 likewise permit air to pass into container 34.

Shield 80 acts as a barrier to prevent the cold water in the container 34 from chilling the boiling water as it moves upwardly within the percolator tube 71. Water passes through opening 86, through channel 78 into cup 48, and, after boiling, up through the tube 71.

After there has been sufficient percolation, as determined by the timer and thermostat 65, the current is reduced by the said timer and thermostat 65 to provide only enough heat from coil 63 to provide a coffee warming function rather than a boiling function. Such timer and thermostat 65 may be of any well known commercially available type and forms no part of the present invention as such.

After the coffee has been brewed, the lid 40 is lifted from the container 34 and the infusion can 91 is lifted off the tube 71 and discarded. Tube 71 and shield 80 are lifted out of the container 34 and the lid 40 replaced into a position as shown in FIGURE 3. The coffee brewer and server 34 is now ready to act as a server, wherein the user grasps the handle 36 and slides the assembly 21 from base 20 and pours through spout 37. Between pourings, the assembly 21 is slid into engagement with base 20 whereby prongs 54 and 55 engage plug receptacle 31 and an electrical connection is established.

The percolating and serving cycle can be repeated to brew and serve additional coffee.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described by invention, what I claim as new and desire to secure by Letters Patent is:

1. A coffee brewer and server comprising in combination a base including tracks and a plug receptacle positioned with respect to the tracks; and a brewer and server assembly slidably engaging the base, and selectively removable from the base, said assembly having runners thereon adapted to slidably engage the tracks on the base whereby the assembly is securely held and accurately positioned on the base, and an electrical compartment including prongs extending therefrom positioned with respect to the runners; said receptacle and prongs being positioned with respect to said tracks and runners respectively whereby said prongs engage said receptacle when the runners slidably engage the tracks.

2. A coffee brewer and server of claim 1 wherein the tracks on the base are of the same cross-sectional contour as the runners on the assembly.

3. A coffee brewer and server of claim 1, wherein the plug receptacle is removably secured in the base by clamp means.

4. A coffee maker and brewer comprising in combination a base, and a brewer and server assembly secured to the base, said assembly having a container portion for receiving water for brewing coffee, wherein the assembly includes, a percolating tube for percolating liquid and a shield, vertically and concentrically disposed with respect to the percolating tube and extending around the percolating tube to form a space between the shield and the tube, and forming a barrier between the water in the container and the percolating tube, said shield having a restrictive opening at its lower end to permit a restricted quantity of water to enter into the space between the shield and the percolator tube, and being open at the top and having a flaring portion at the bottom engaging by means of force fit into the assembly, whereby said shield creates an insulating water pocket.

5. A coffee brewer and server comprising in combination a base and a brewer and server assembly secured to the base, wherein said assembly includes a percolating tube for percolating liquid, and a disposable infusion can containing coffee grounds for receiving the percolating liquid, said can being in the form of a right circular cylinder, and having a top, bottom, and sides, the bottom of the can having a plurality of openings spaced over the entire bottom including a pre-scored portion adapted to tear under the force of the end of the percolator shaft, the top having a plurality of perforations initially covered by a flexible foil which is peelable from the can prior to use in the coffee brewer and server, said can being positioned on the percolator tube within the coffee brewer and maker whereby the percolating liquid passes out of the top of the percolating tube in spray form, into the can, over and through the coffee grounds, and out the bottom perforations.

References Cited
UNITED STATES PATENTS

| | | | |
|---|---|---|---|
| 964,518 | 7/1910 | Holley | 99—311 |
| 2,145,107 | 1/1939 | Benander | 219—432 |
| 2,817,743 | 12/1957 | Foster | 99—310 |
| 3,095,801 | 7/1963 | Fogg | 99—312 |

ROBERT W. JENKINS, *Primary Examiner.*